(12) United States Patent
Partyka et al.

(10) Patent No.: US 11,305,808 B2
(45) Date of Patent: Apr. 19, 2022

(54) STEERING SHAFT CLAMP YOKE WITH BOLT BLOCKING COMPONENT

(71) Applicant: Steering Solutions IP Holding Corporation, Saginaw, MI (US)

(72) Inventors: Michael E. Partyka, Saginaw, MI (US); William D. Cymbal, Freeland, MI (US); William Knight, Bay City, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 16/908,728

(22) Filed: Jun. 22, 2020

(65) Prior Publication Data
US 2021/0394814 A1    Dec. 23, 2021

(51) Int. Cl.
*B62D 1/184*    (2006.01)
*B62D 1/20*    (2006.01)

(52) U.S. Cl.
CPC ............. *B62D 1/184* (2013.01); *B62D 1/20* (2013.01)

(58) Field of Classification Search
CPC . B62D 3/12; B62D 3/123; B62D 1/16; B62D 1/184; B62D 1/189; B62D 1/20; F16D 3/387; F16D 1/076; F16D 1/08; F16D 1/0805; F16D 1/0864; Y10T 403/1624; Y10T 403/581; Y10T 403/7188
See application file for complete search history.

(56) References Cited

U.S. PATENT DOCUMENTS

| | | | | |
|---|---|---|---|---|
| 5,090,833 A | * | 2/1992 | Oertle | B62D 1/20 403/12 |
| 5,253,949 A | * | 10/1993 | Oxley | B62D 1/16 403/155 |
| 5,358,350 A | * | 10/1994 | Oertle | B62D 1/20 403/12 |
| 5,647,686 A | * | 7/1997 | Hancock | B62D 1/16 403/328 |
| 5,669,270 A | * | 9/1997 | Cymbal | B62D 1/16 280/777 |
| 6,575,658 B2 | * | 6/2003 | Daniel | F16B 2/18 403/316 |
| 6,739,790 B1 | * | 5/2004 | Crudele | B62D 1/20 403/290 |
| 7,488,134 B2 | * | 2/2009 | Kinme | B62D 1/16 403/12 |

(Continued)

*Primary Examiner* — Laura Freedman
(74) *Attorney, Agent, or Firm* — Dickinson Wright PLLC

(57) ABSTRACT

A steering assembly includes a pinion shaft. The steering assembly also includes a clamp yoke defining a central opening for axially receiving the pinion shaft and defining a counter bore for receiving a fastener that couples the pinion shaft to the yoke. The steering assembly further includes a blocking assembly fixed to the clamp yoke. The blocking assembly includes a resilient member having a first leg, a second leg and a connecting end. The blocking assembly also includes a blocking member coupled to the first leg and the second leg of the resilient member, the blocking member rotatable between a blocking position and a non-blocking position, the blocking position blocking the counter bore in an initial position and rotatable upon contact with the pinion shaft to be clear of the counter bore in the non-blocking position.

12 Claims, 4 Drawing Sheets

(56) References Cited

U.S. PATENT DOCUMENTS

| | | | | |
|---|---|---|---|---|
| 7,513,709 | B2* | 4/2009 | Shimada | F16D 1/0817 |
| | | | | 403/399 |
| 8,038,362 | B2* | 10/2011 | Kawanabe | F16D 1/116 |
| | | | | 403/11 |
| 8,092,313 | B2* | 1/2012 | Shibahiraki | B62D 1/20 |
| | | | | 464/134 |
| 8,235,420 | B2* | 8/2012 | Moriyama | F16D 1/0864 |
| | | | | 280/777 |
| 8,262,309 | B2* | 9/2012 | Dallara | B62D 1/16 |
| | | | | 403/233 |
| 8,740,712 | B2* | 6/2014 | Kim | F16D 3/387 |
| | | | | 464/23 |
| 9,205,859 | B2* | 12/2015 | Tinnin | B62D 1/20 |
| 9,290,198 | B2* | 3/2016 | Doerr | B62D 1/20 |
| 9,545,942 | B2* | 1/2017 | Tinnin | F16B 37/041 |
| 9,765,823 | B2* | 9/2017 | Ikeda | F16D 1/0864 |
| 9,863,479 | B2* | 1/2018 | Mottier | F16D 1/033 |
| 10,288,125 | B2* | 5/2019 | Kurokawa | F16D 1/0894 |
| 10,315,685 | B2* | 6/2019 | Assmann | B62D 3/12 |
| 2014/0140759 | A1* | 5/2014 | Bodtker | F16D 1/0894 |
| | | | | 403/322.2 |
| 2019/0002011 | A1* | 1/2019 | Cymbal | F16D 1/0847 |
| 2020/0140001 | A1* | 5/2020 | Partyka | F16D 1/108 |

* cited by examiner

STEERING SHAFT CLAMP YOKE WITH BOLT BLOCKING COMPONENT

FIELD OF THE INVENTION

This disclosure generally relates to steering column assemblies and, more particularly, to a bolt blocking component for a steering shaft clamp yoke.

BACKGROUND

A typical assembly operation for an automobile includes the assembly of a vehicle body and chassis in different locations. In one or more locations, the vehicle body and the chassis are joined and the vehicle body is assembled onto the chassis. One of the systems that needs to be connected after the vehicle body and chassis are assembled is an intermediate shaft being coupled with a steering system, such as to a steering gear or to a rack and pinion.

To couple the intermediate shaft and the steering system, a clamp yoke in the intermediate shaft is attached to the steering system, for example, to a pinion shaft with a pinch bolt. Due to the difficulty in accessing the pinch bolt and the amount of time allocated for this operation, it is a technical challenge for an assembly operator to accomplish the connection of the intermediate shaft and the steering system in a robust manner.

There have been several cases where the operator tightened the pinch bolt to couple the pinion shaft with the intermediate shaft at a particular location only to find out later that the intermediate shaft and the pinion shaft are not correctly assembled. This in turn leads to an increase in time that is devoted to inspecting the connections of the intermediate shaft and the steering system. Further yet, even after such additional measurements performed during the inspection, instances have been reported where the two parts (steering shaft and pinion shaft) have become separated after the assembly.

SUMMARY

According to one aspect of the disclosure, a steering assembly includes a pinion shaft. The steering assembly also includes a clamp yoke defining a central opening for axially receiving the pinion shaft and defining a counter bore for receiving a fastener that couples the pinion shaft to the yoke. The steering assembly further includes a blocking assembly fixed to the clamp yoke. The blocking assembly includes a resilient member having a first leg, a second leg and a connecting end. The blocking assembly also includes a blocking member coupled to the first leg and the second leg of the resilient member, the blocking member rotatable between a blocking position and a non-blocking position, the blocking position blocking the counter bore in an initial position and rotatable upon contact with the pinion shaft to be clear of the counter bore in the non-blocking position.

According to another aspect of the disclosure, a method of assembling a steering assembly is provided. The method includes positioning a blocking member within a slot of a clamp yoke to block a counter bore defined by the clamp yoke. The method also includes inserting a pinion shaft into a central aperture defined by the clamp yoke. The method further includes contacting the blocking member with the pinion shaft. The method yet further includes rotating the blocking member by insertion of the pinion shaft to be out of the counter bore. The method also includes inserting a fastener through the counter bore to fix the axial position of the pinion shaft relative to the clamp yoke.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, the present disclosure will be described with reference to specific embodiments. It is to be understood that the disclosed embodiments are merely illustrative of the present disclosure and may be embodied in various and alternative forms. Various elements of the disclosed embodiments may be combined or omitted to form further embodiments of the present disclosure. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
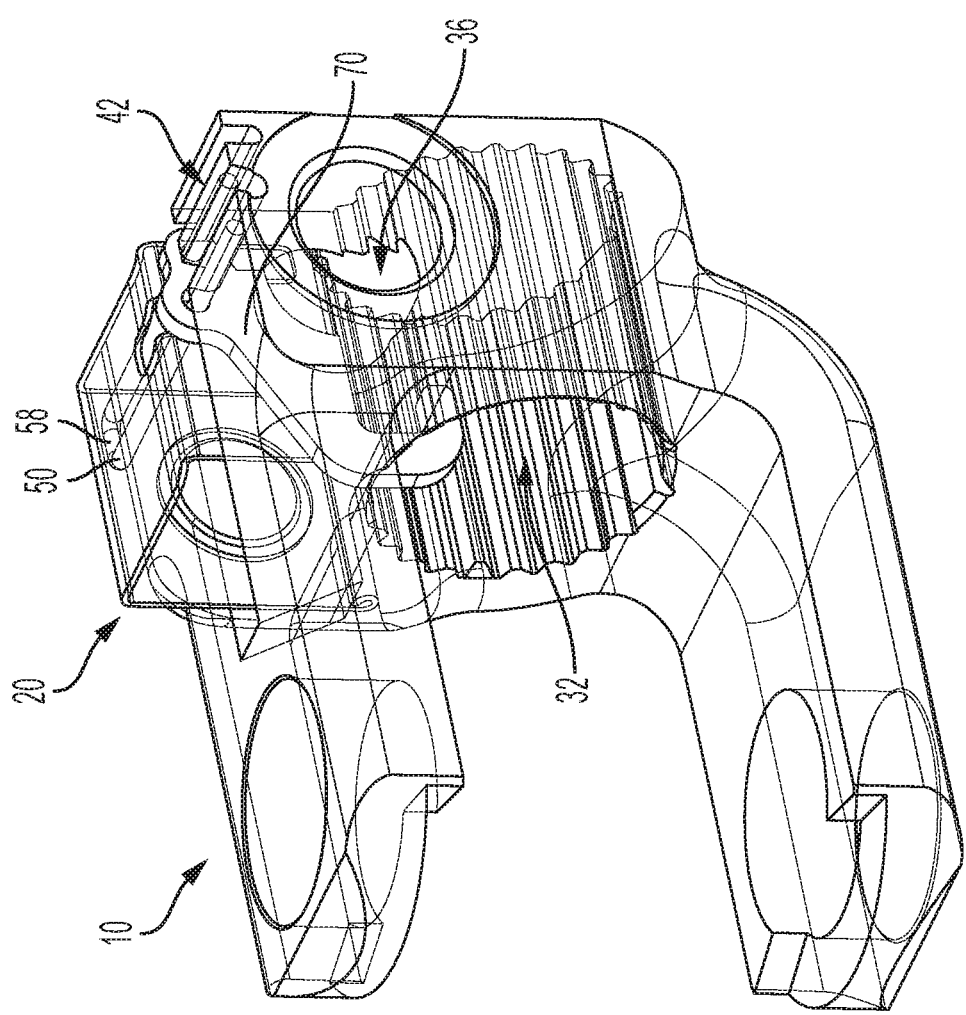
FIG. 1 is a perspective view of a clamp yoke of an intermediate steering shaft.

FIG. 1 illustrates a clamp yoke 10 that includes a bolt blocking assembly 20. The clamp yoke 10 may be used to assist with coupling of a steering shaft and a rack and pinion assembly of a steering system, as described herein. In such an embodiment, the clamp yoke 10 is operatively coupled to a steering shaft (not shown) and is to be assembled to a pinion shaft 30 (partially shown in FIGS. 3 and 4) that is part of a rack and pinion assembly.

The clamp yoke 10 defines a space for the pinion shaft 30 to be inserted for coupling to the clamp yoke 10, and therefore the steering shaft in an indirect manner. It is desirable to couple the pinion shaft 30 and the clamp yoke 10 at a specific axial position of the pinion shaft 30. The embodiments described herein facilitate precise and reliable coupling at such a desired position.

Figure 2:
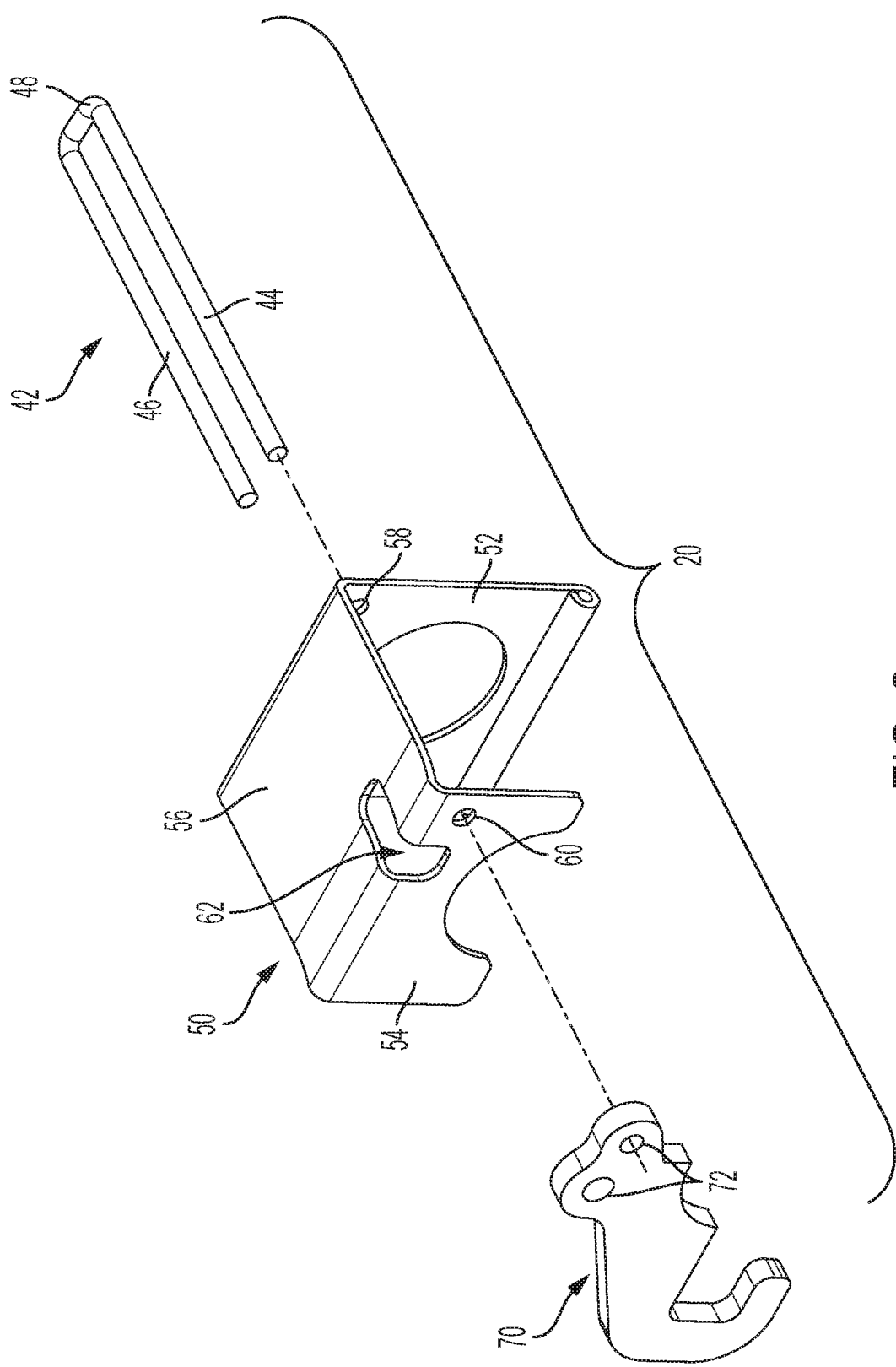
FIG. 2 is a perspective, disassembled view of a bolt blocking assembly for the clamp yoke.

Referring to FIGS. 1 and 2, the bolt blocking assembly 20 for the clamp yoke 10 is illustrated. The bolt blocking assembly 20 includes a resilient member 42 that is formed in a substantially U-shape. The U-shape of the resilient member 42 is defined by a first leg 44, a second leg 46 and a connecting end 48. The connecting end 48 joins the first leg 44 and the second leg 46. The bolt blocking assembly 20 also includes a clip 50. The clip 50 is substantially U-shaped, with a first wall 52, a second wall 54 and a connecting wall 56, with the connecting wall 56 joining the first wall 52 and the second wall 54.

The resilient member 42 is attached to the clip 50. In particular, the clip 50 includes a pair of insertion holes 58 defined within the first wall 52. Each of the insertion holes 58 is sized to receive one of the first and second legs 44, 46 of the resilient member 42. Only one of the insertion holes 58 is shown in FIG. 2, but FIG. 1 is shown transparently to illustrate both insertion holes 58. The first leg 44 and the second leg 46 extend through the insertion holes 58 toward and beyond the second wall 54 of the clip 50. The first leg 44 extends through an outlet hole 60 defined in the second wall 54 of the clip. The second leg 46 extends through a cutout portion 62 of the clip 50. The cutout portion 62 is an opening that is larger than the outlet hole 60 and is a cutout of material from the second wall 54 and the connecting wall 56. In other words, the cutout portion 62 is a continuous opening, a portion of which is in the second wall 54 and the other portion being in the connecting wall 56. The cutout portion 62 allows the second leg 46 to move upwardly during operation of the bolt blocking assembly 20, as will be appreciated from the description herein.

A blocking member 70 includes a pair of apertures 72, with each of the apertures sized to receive one of the first and second legs 44, 46 of the resilient member 42. The blocking member 70 is located adjacent to—or slightly spaced from the second wall 54 of the clip 50. As shown in FIG. 1, the clip 50 couples the bolt blocking assembly 20 to the clamp yoke 10.

Figure 6:
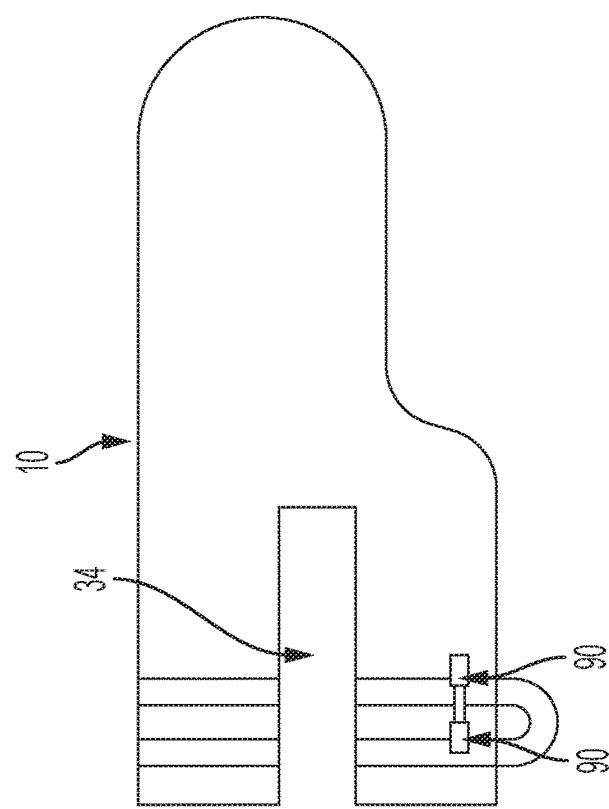
FIG. 6 is an elevational view of the clamp yoke illustrating the metal material formed or staked at locations for the bolt blocking assembly.
Figure 5:
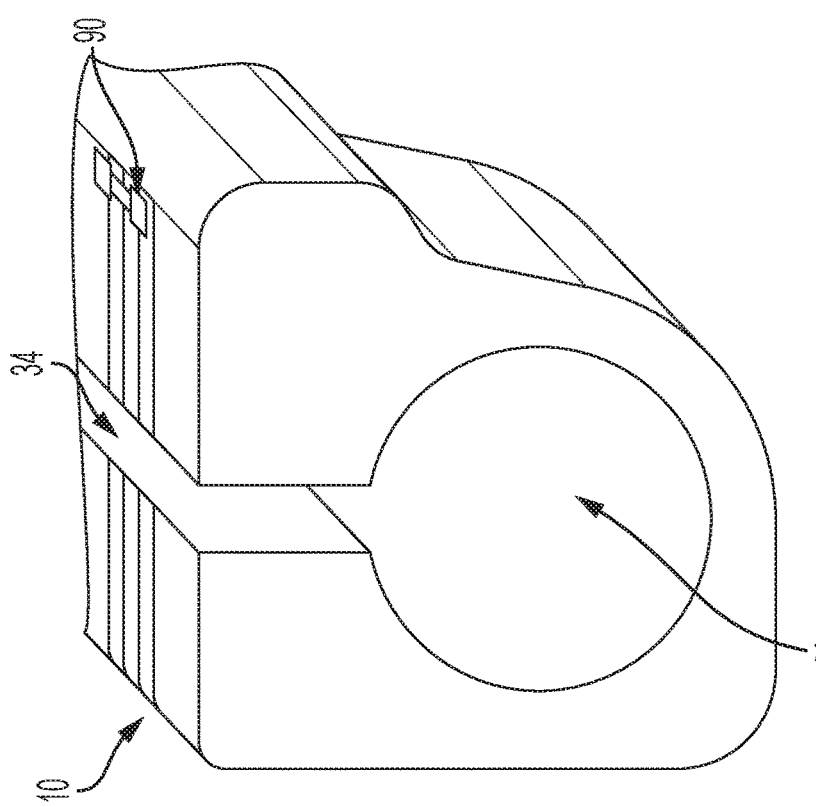
FIG. 5 is a perspective view of a clamp yoke illustrating metal material formed or staked at locations for the bolt blocking assembly.

As shown in FIGS. 1 and 5, the clamp yoke 10 defines a central aperture 32 configured to receive the pinion shaft 30. FIGS. 1, 5 and 6 illustrate a slot 34 extending from the central aperture 32 through a wall of the clamp yoke 10. The central aperture 32 and the slot 34 define a continuous opening. As shown in FIG. 1, a counter bore 36 extends through the clamp yoke 10. The counter bore 36 extends about an axis that is perpendicular to an axis of the central aperture 32. The counter bore 36 is sized to receive a bolt or a similar mechanical fastener to lock the pinion shaft 30 in a desired axial position once inserted into the central aperture 32. As described herein, the bolt blocking assembly 20 ensures that that pinion shaft 30 is in such a desired position.

Figure 4:
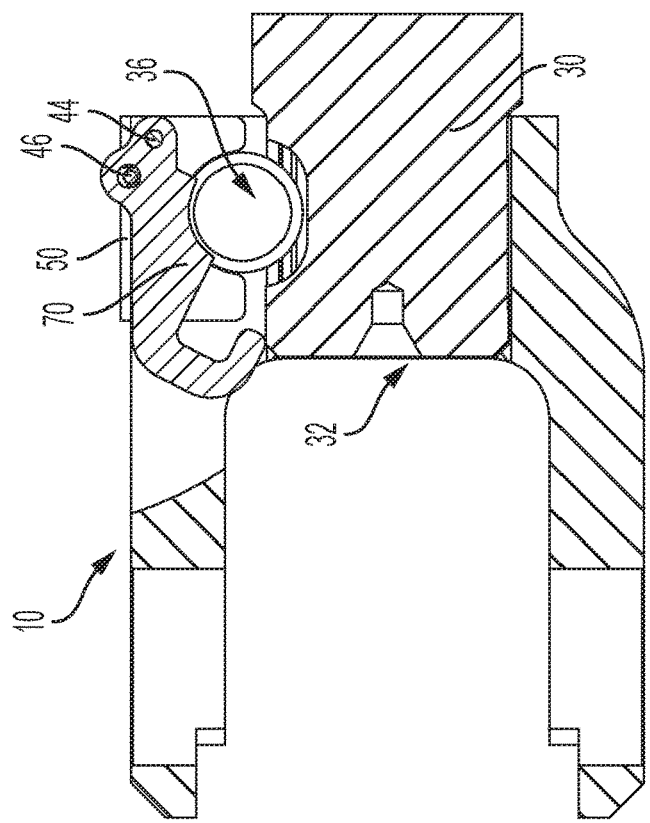
FIG. 4 is a cross-sectional view of the clamp yoke with the bolt blocking assembly in a non-blocking position.
Figure 3:
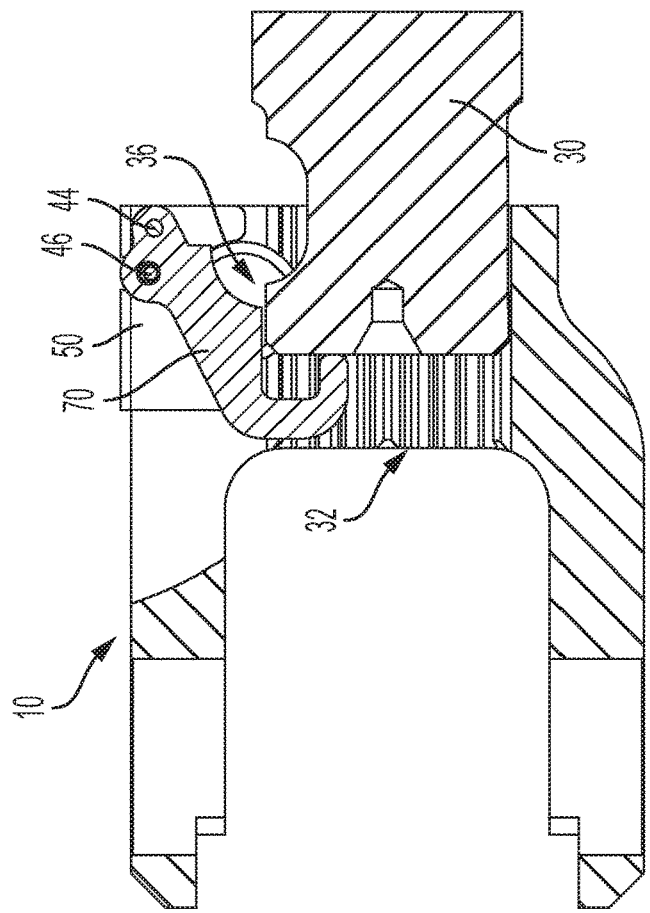
FIG. 3 is a cross-sectional view of the clamp yoke with the bolt blocking assembly in a blocking position.

FIGS. 3 and 4 illustrate a progression of axial insertion of the pinion shaft 30 toward a desired axial position relative to the clamp yoke 10. Due to the connection of the blocking member 70 to the resilient member 42, the blocking member 70 is rotatable within the slot 34 of the clamp yoke 10. The first leg 44 of the resilient member 42 is an axis of rotation of the resilient member 42 and the blocking member 70. Connection of the second leg 46 to the blocking member 70 biases the blocking member to rotate toward a blocking position (FIG. 3) within the slot 34, thereby preventing insertion of a fastener through the counter bore 36. As the pinion shaft 30 contacts the blocking member 70 and advances axially (from FIGS. 3 to 4), the spring force of the resilient member 70 is overcome and the blocking member 70 is rotated to a non-blocking position (FIG. 4). The non-blocking position allows a fastener, such as a bolt (e.g., pinch bolt) to be passed through the counter bore 36 and into the slot 34 of the clamp yoke 10. The cutout portion 62 of the clip 50 provides freedom of movement of the second leg 46 and the blocking member 70. Meanwhile, the holes of the clip 50 that the first leg 44 is retained within result in the first leg 44 functioning as an axis, as described above.

FIGS. 5 and 6 show an embodiment of the bolt blocking assembly 20 that does not include the clip 50 described above. In FIGS. 5 and 6, the legs 44, 46 of the resilient member 42 are disposed within grooves formed in the surface of the clamp yoke 10. The resilient member 42 is has retention features by forming metal material or metal staked to the clamp yoke 10 in the locations referenced with numeral 90 to retain the resilient member 42 to the clamp yoke 10. While the precise locations 90 of the heat staking may vary depending on the particular application, the locations 90 are proximate the connecting end 48 of the resilient member 42.

In any of the disclosed embodiments, the pinion shaft 30 is in the correct location, that is, a predetermined distance inside the clamp yoke 10, the counter bore 36 for the fastener is unrestricted, thereby leading to a connection in a desired position. The fastener (e.g., bolt) can be tightened to couple the pinion shaft 30 and the clamp yoke 10 only when the blocking member 70 has moved to provide a clear path through the counter bore 36, ensuring an error-free assembly.

The counter bore 36 is obstructed by the blocking member 70 of the bolt blocking assembly 20 over a range of blocking positions. The blocking member 70 is eventually rotated to a far enough extent during axial installation of the pinion shaft 30 to provide a clear path through the counter bore 36 for a bolt to be installed and tightened to couple the clamp yoke 10 and the pinion shaft 30.

In some embodiments, the bolt blocking assembly 20 does not have to be removed after assembly, and the assembly 20 does not affect the yoke clamping characteristics.

While the invention has been described in detail in connection with only a limited number of embodiments, it can be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering assembly comprising:
   a pinion shaft;
   a clamp yoke defining a central opening for axially receiving the pinion shaft and defining a counter bore for receiving a fastener that couples the pinion shaft to the yoke; and
   a blocking assembly fixed to the clamp yoke, the blocking assembly comprising:
     a resilient member having a first leg, a second leg and a connecting end, wherein the resilient member is directly coupled to the clamp yoke, wherein the first leg and the second leg of the resilient member are disposed within respective grooves defined by the clamp yoke; and
     a blocking member coupled to the first leg and the second leg of the resilient member, the blocking member rotatable between a blocking position and a non-blocking position, the blocking position blocking the counter bore in an initial position and rotatable upon contact with the pinion shaft to be clear of the counter bore in the non-blocking position.

2. The steering assembly of claim 1, wherein the blocking member is located in a slot defined by the clamp yoke.

3. The steering assembly of claim 1, wherein the resilient member is formed at least partially with spring steel.

4. The steering assembly of claim 1, wherein the resilient member is formed in a U-shape.

5. The steering assembly of claim 1, wherein the resilient member includes at least one retention feature by forming metal material or metal staked to the clamp yoke.

6. The steering assembly of claim 5, wherein the resilient member has retention features by forming metal material or metal staked to the clamp yoke proximate the connecting end of the resilient member.

7. The steering assembly of claim 1, wherein the fastener is a pinch bolt.

8. The steering assembly of claim 1, wherein the counter bore extends along a bore axis and the central opening extends along an opening axis, the bore axis oriented perpendicular to the opening axis.

9. A steering assembly comprising:
   a pinion shaft;
   a clamp yoke defining a central opening for axially receiving the pinion shaft and defining a counter bore for receiving a fastener that couples the pinion shaft to the yoke; and
   a blocking assembly fixed to the clamp yoke, the blocking assembly comprising:
      a resilient member having a first leg, a second leg and a connecting end; and
      a blocking member coupled to the first leg and the second leg of the resilient member, the blocking member rotatable between a blocking position and a non-blocking position, the blocking position blocking the counter bore in an initial position and rotatable upon contact with the pinion shaft to be clear of the counter bore in the non-blocking position; and
      a clip coupled to the clamp yoke, wherein the resilient member is coupled to the clip.

10. The steering assembly of claim 9, wherein the clip comprises a first wall, a second wall and a connecting wall, the first wall defining a pair of insertion holes, the second wall defining an outlet hole, and the second wall and the connecting wall defining a cutout portion.

11. The steering assembly of claim 10, wherein the first leg of the resilient member extends through one of the insertion holes and the outlet hole, wherein the second leg of the resilient member extends through one of the insertion holes and the cutout portion.

12. A method of assembling a steering assembly comprising:
   positioning a blocking member within a slot of a clamp yoke to block a counter bore defined by the clamp yoke;
   inserting a pinion shaft into a central aperture defined by the clamp yoke;
   contacting the blocking member with the pinion shaft;
   rotating the blocking member by insertion of the pinion shaft to be out of the counter bore; and
   inserting a fastener through the counter bore to fix the axial position of the pinion shaft relative to the clamp yoke; and
   coupling the blocking member to a first leg and a second leg of a resilient member, the resilient member indirectly coupled to the clamp yoke with a clip secured to the clamp yoke.

* * * * *